United States Patent Office 3,455,999
Patented July 15, 1969

3,455,999
SUBSTITUTED MALONIC ACID MONOHYDRAZIDES
Rudolf Pfister and Alfred Sallmann, Basel, and Winrich Hammerschmidt, Muttenz, Basel-Land, Switzerland, assignors to Geigy Chemical Corporation, Greenburgh, N.Y., a corporation of Delaware
No Drawing. Filed June 2, 1964, Ser. No. 372,104
Claims priority, application Switzerland, June 7, 1963, 7,168/63
Int. Cl. C07c 109/10, 109/08
U.S. Cl. 260—518                7 Claims

ABSTRACT OF THE DISCLOSURE

The compounds are of the class of lower alkyl malonic acid-N,N'-diphenylhydrazides. They are useful antiphlogistic and antipyretic agents. An illustrative species is n-propyl malonic acid-N,N'-diphenylhydrazide.

DETAILED DISCLOSURE

The present invention concerns new substituted malonic acid monohydrazides which have valuable pharmacological properties, as well as processes for the production of these new compounds.

It has been found that compounds falling under the formula

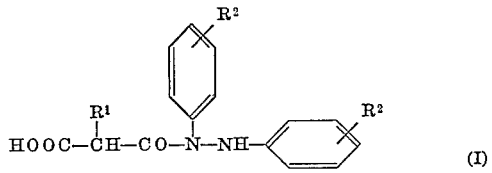

wherein $R^1$ represents a hydrocarbon radical free from aliphatic unsaturation and having from 2 to 8 carbon atoms, in particular alkyl of from 2 to 8 carbon atoms, phenylalkyl having at most 8 carbon atoms or cycloalkyl of at most 8 carbon atoms at least 4 of which are ring members, and Both $R^2$'s represent identically either hydrogen, chlorine or bromine atoms, as well as their pharmaceutically acceptable salts with inorganic and organic bases, especially their alkali metal salts, and preferably those compounds falling under Formula I in which $R^1$ represents alkyl having from 3 to 5 carbon atoms, benzyl or phenylethyl, are mild analgesic agents and are particularly suitable for oral application, while the known lower alkyl esters of the acids of Formula I possess no significant analgesic activity.

Moreover, the new compounds falling under Formula I and their salts with inorganic and organic bases have other valuable pharmacological properties, in particular antiphlogistic and antipyretic activity with, at the same time, relatively slight toxicity. They are suitable, for example, for the treatment of rheumatic and other inflammatory processes such as, e.g., the prophylaxis and treatment of thrombophlebitis, for which purpose they can be administered orally or rectally or, in the form of aqueous solutions of their salts, also parentally, e.g., intramuscularly or intravenously. With regard to their parenteral application, the neutral to, at most, weakly basic reaction of the aqueous solutions of their salts is particularly advantageous.

Particularly active are those compounds falling under Formula I in which the substituents $R^2$ are in paraposition to the nitrogen atom of the hydrazinyl moiety to which they are respectively linked.

The substituted malonic acid hydrazides of Formula I are produced by heating, in an aqueous or aqueous-organic medium, a compound of the formula

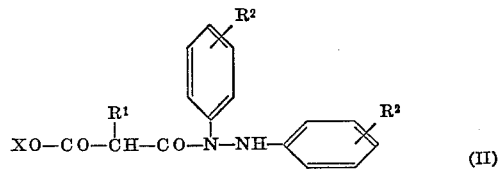

wherein

X represents a lower alkyl radical, e.g., ethyl or methyl, or a benzyl radical and $R^1$ and $R^2$ have the meanings given above, with the substantially equivalent amount of an inorganic base such as alkali hydroxide or alkaline earth hydroxide, in particular sodium hydroxide or calcium hydroxide, liberating the acid from the solution of its salt obtained and, if desired, converting it into a salt with an inorganic or organic base.

To perform the reaction according to the invention, for example, the starting materials are suspended in the calculated amount of a strongly diluted, e.g., 0.2 to 2 N aqueous sodium hydroxide solution or potassium hydroxide solution, and the suspension is refluxed for some time, e.g., from 8 to 36 hours. The addition of an organic, easily water-soluble or, preferably, a water-miscible solvent, such as, e.g., dioxan, accelerates the hydrolysis. The reaction product can be precipitated by acidifying the reaction solution. If necessary, e.g., because of the solubility of the reaction product, the separation from unchanged starting material can be performed in potassium hydrogen carbonate solution.

Another modification of the process for the production of compounds of the Formula I consists in hydrogenolyzing a compound of the Formula II, wherein X is the benzyl radical, and if desired, converting the compound obtained of the Formula I into a salt with an inorganic or organic base.

To perform the reaction according ot the invention, the compound of Formula II is dissolved, preferably in methanol, and then hydrogenated at room temperature and under normal pressure in the presence of a suitable catalyst until the calculated amount of hydrogen has been taken up. Palladium catalysts, for example, are suitable catalysts.

Processes for the production of a starting material of the Formula II are described in the literature. Another process, the condensation of an α-substituted malonic acid monoalkyl ester with hydrazobenzene by means of N,N'-dicyclohexyl carbodiimide, is given in the Example 1(a). Further starting materials can be produced in an analogous manner.

Among the salts of compounds according to Formula I, the alkaline and the earth-alkaline salts and especially the sodium, lithium and calcium salts, of n-butylmalonic acid - N,N' - diphenylhydrazide are particularly useful for the purposes outlined above; they are produced by dissolving the aforesaid hydrazide in an equivalent amount of the corresponding base. The salts are isolated from the mother liquor by conventional techniques.

Solutions of alkali metal salts of the new compounds of the Formula I can be produced directly by dissolving the compounds in the calculated amount of alkaline hydroxide solution, i.e. in solutions of lithium, sodium or potassium hydroxide. If desired, the new compounds produced according to the invention or their alkali metal salts or salts with organic bases such as, dimethylaminoethanol, diethylaminoethanol or piperazine, are converted into medicaments by combination with suitable pharmaceutical carriers. Such medicaments are, for example, solutions for injection consisting of aqueous solutions of the alkali metal salts. Other medicaments are, e.g., tablets, capsules containing powders and granulates and other forms of application suitable for oral administration which are produced, e.g., by mixing the new compounds of Formula I or their salts with pharmaceutical carriers such as starch, highly dispersed silicic acid, magnesium stearate, etc. and suitable shaping. The new compounds can also be worked up into suppositories with semisolid substances having a suitable melting range, e.g., cocoa butter.

The following examples illustrate the performance of the processes according to the invention but are by no means the sole methods of performing same. The temperatures are in degrees centigrade.

Example 1

(a) A solution of 22.4 g. of dicyclohexylcarbodiimide in 120 ml. of abs. tetrahydrofuran is added dropwise at 5–10° in an atmosphere of nitrogen to a solution of 20 g. of n-butyl malonic acid monoethyl ester and 19.6 g. of freshly recrystallized hydrazobenzene in 320 ml. of anhydrous tetrahydrofuran. The mixture is then stirred for 15 hours at 25° in an atmosphere of nitrogen, then the precipitated dicyclohexyl urea is filtered off and the filtrate, after the addition of 3 drops of glacial acetic acid, is evaporated to dryness in vacuo. The residue is dissolved in 1 liter of ether, the ethereal solution is extracted twice with 2 N potassium bicarbonate solution and twice with 2 N hydrochloric acid, whereupon it is washed with water until the washing water is neutral. The ethereal solution is dried over sodium sulfate and concentrated in vacuo. The residue is fractionally distilled under high vacuum whereupon the ester is obtained as a yellow oil. B.P. 170°/0.05 torr. Crystals which melt at 63–65° are obtained from cyclohexane.

(b) A suspension of 7.1 g. of the ester obtained according to (a) in 40 ml. of aqueous 0.5 N sodium hydroxide solution is refluxed for 24 hours in an atmosphere of nitrogen. The solution is filtered and traces of hydrazobenzene are removed by extraction with ether. The aqueous solution is made acid to Congo paper at 10° with concentrated hydrochloric acid, the oil which separates is dissolved in 40 ml. of ethyl acetate, the ethyl acetate solution is isolated, and washed neutral with water. The solution is then extracted twice with 36 ml. of 0.5 N sodium bicarbonate solution each time.

The separate extracts are made acid to Congo paper with concentrated HCl, extracted with ethyl acetate, the extracts are washed neutral with a little water, dried and concentrated under vacuum. The colorless oil which remains is recrystallized twice from ether/petroleum ether, whereupon n-butyl malonic acid-N,N'-diphenylhydrazide is obtained in the form of short needles which melt at 116–118°.

Starting from correspondingly substituted malonic acid monoethyl esters, the following compounds, for example, are obtained in an analogous manner:

n-Propyl malonic acid-N,N'-diphenylhydrazide, M.P. 93° (from ether/petroleum ether),
Isopropyl malonic acid-N,N'-diphenylhydrazide, M.P. 144° (from ether/petroleum ether),
Tert-butyl malonic acid-N,N'-diphenylhydrazide, M.P. 146° (from ether/petroleum ether),
n-Pentyl malonic acid-N,N'-diphenylhydrazide, M.P. 106° (from ether/petroleum ether),
n-Butyl malonic acid-N,N'-bis(p-chlorophenyl)hydrazide, M.P. 132°, and
Benzyl malonic acid-N,N'-diphenylhydrazide, M.P. 134°.

33 g. of n-butyl malonic acid-N,N'-diphenylhydrazide are dissolved in 1 liter of 0.1 N sodium hydroxide solution. An aqueous 3.5%-solution of the sodium salt of n-butylmalonic acid-N,N'-diphenylhydrazide is thus obtained, which is usable as injection solution. In an analogous manner the other alkaline and earth alkaline salts, as well as the salts with organic bases can be obtained. Some of these salts are less water-soluble than the sodium salt and crystallize directly from the solution.

The above aqueous solution is concentrated by evaporating the water under vacuum of about 11 torrs, and sodium n-butyl malonate-N,N'-diphenylhydrazide is obtained as an oil.

Example 2

4.17 g. of N,N'-diphenyl-n-butyl malonic acid benzyl ester monohydrazide are dissolved in 70 ml. of methanol and hydrogenated at room temperature and under normal pressure after the addition of 1 g. of Pd-Al$_2$O$_3$ catalyst. The theoretical amount of hydrogen is taken up after 2½ hours and the hydrogenation ceases. The catalyst is filtered off and the filtrate is evaporated to dryness under reduced pressure. Recrystallized from ether/petroleum ether, n-butyl malonic acid-N,N'-diphenylmonohydrazide is obtained as colorless crystals which melt at 116–117°.

We claim:
1. n-Butyl malonic acid-N,N'-diphenylhydrazide.
2. Tert-butyl malonic acid-N,N'-diphenylhydrazide.
3. n-Pentyl malonic acid N,N'-diphenylhydrazide.
4. Benzyl malonic acid-N,N'-diphenylhydrazide.
5. n-Butyl malonic acid - N,N' - bis(p-chlorophenyl)hydrazide.
6. The sodium salt of n-butyl malonic acid-N,N'-diphenylhydrazide.
7. The calcium salt of n-butyl malonic acid N,N'-diphenylhydrazide.

No references cited.

LORRAINE A. WEINBERGER, Primary Examiner
L. ARNOLD THAXTON, Assistant Examiner

U.S. Cl. X.R.
260—501.11: 424—319